US005660734A

United States Patent [19]

Agree et al.

[11] Patent Number: 5,660,734

[45] Date of Patent: Aug. 26, 1997

[54] PAINT SPRAY BOOTH TREATMENT PROGRAM FOR WATERBORNE AND/OR SOLVENTBORNE PAINTS

[75] Inventors: Howard B. Agree, Newtown; Jen-Chi Chen, Morrisville, both of Pa.

[73] Assignee: BetzDearborn Inc., Trevose, Pa.

[21] Appl. No.: 587,440

[22] Filed: Jan. 17, 1996

[51] Int. Cl.[6] .................................. C02F 1/52; C02F 1/54

[52] U.S. Cl. .......................... 210/712; 210/728; 210/730; 210/734; 210/930

[58] Field of Search .................................... 210/712, 728, 210/730, 734, 930

[56] References Cited

U.S. PATENT DOCUMENTS

| | | | |
|---|---|---|---|
| 3,985,659 | 10/1976 | Felicetta et al. | 252/8.5 A |
| 4,861,491 | 8/1989 | Svensson | 210/712 |
| 5,034,136 | 7/1991 | Cody et al. | 210/712 |
| 5,073,205 | 12/1991 | Morse | 134/38 |
| 5,076,939 | 12/1991 | Hunter et al. | 210/712 |
| 5,250,189 | 10/1993 | Rey | 210/712 |
| 5,250,191 | 10/1993 | Cory et al. | 210/712 |

*Primary Examiner*—Peter A. Hroskoci
*Assistant Examiner*—Betsey J. Morrison
*Attorney, Agent, or Firm*—Alexander D. Ricci; Steven D. Boyd

[57] ABSTRACT

Methods of treating circulating water containing over-sprayed waterborne and/or solventborne paint, such as in a paint spray booth operation with copolymer of lignosulfonate and a cationic monomer subunit with $Na_2CO_3$ and/or NaOH. The method does not require the use of metal salts or silicates.

3 Claims, No Drawings

PAINT SPRAY BOOTH TREATMENT PROGRAM FOR WATERBORNE AND/OR SOLVENTBORNE PAINTS

FIELD OF THE INVENTION

The present invention relates to methods of treating circulating water in a paint spray booth containing waterborne and/or solventborne paint. More particularly, the present invention relates to a paint spray booth coagulation/flocculation/detackification method which employs a copolymer of lignosulfonate and a cationic monomer subunit such as trimethylammoniumethylacrylate chloride.

BACKGROUND OF THE INVENTION

The spray painting of automobile bodies, truck engines, appliances and other industrial goods is customarily carried out in enclosed areas called paint spray booths. These booths act to contain any fumes or oversprayed paint, to reduce the chances of airborne contamination, and to protect the painters from these hazards. The booths vary in size but are somewhat basic in their design and operation. A typical paint spray booth would consist of a work area, back section with mist eliminators and a sump.

The units to be painted generally pass through the work area while an air flow makes the oversprayed paint contact either the sump water or the spray from a water curtain. The air is scrubbed with recirculating water at a water curtain, passes through mist eliminators and is removed by an exhaust fan.

Even though paint transfer efficiencies have increased through improved application technologies, up to one-half of all paint sprayed may not reach its intended article. As a result, a significant concentration of paint builds up in the system and agglomeration can occur. The resultant mass is a sticky, tacky material which can plug mist eliminators, shower heads, and even recirculating pumps. When this happens, scrubbing efficiency decreases leading to potentially hazardous conditions of unchecked paint emissions being discharged into the atmosphere. Such conditions may also present safety hazards to paint spray booth operators.

A major problem associated with the spraying process involves the tacky or adhesive nature of the oversprayed coating materials. These tacky organic deposits are subject to bacterial growth and fungi proliferation which conditions generate corrosion and odor problems. In addition, the paint solids that are recirculated can form suspensions in the water. They remain tacky and can create expensive separation and disposal problems.

Due to environmental pressure to reduce volatile organic compounds released into the atmosphere from the use of hydrocarbon solvent (oil) based paints, manufacturers are increasingly employing waterborne paints. The use of waterborne paints creates a problem in conventional paint spray booth systems since the oversprayed paint largely remains dispersed in the water held in the sump basin. Before this water can be recirculated to the mist eliminators for removal of additional oversprayed paint, the dispersed paint previously collected must be first removed. Skimming or filtering the wastewater is ineffective since these paints exhibit no natural hydrophobicity or coagulation characteristics. Treatment programs for waterborne paints are therefore often different than treatment programs for hydrophobic oil based paints. The coagulation of dispersed paint particles is the primary objective in treatment waterborne paints. Tackiness is generally not a problem as it is with oversprayed oil based paints.

In some large industrial facilities, numerous paint spray operations may be running simultaneously. Frequently, the water which has collected the oversprayed paint may feed into a single sump. At this location the water is cleaned and then circulated back to the various spray booths from which it came. A unique problem arises at those industrial facilities in which waterborne paints are sprayed in some booths while oil based paints are sprayed in others and the water containing oversprayed paints from all booths is fed into a common sump.

Methods of detackifying water contaminated with oversprayed waterborne and/or solventborne paint are known in the art. For example, U.S. Pat. No. 5,076,939 discloses a method of detackifying paint spray operations waste by adjusting the alkalinity of the paint spray booth water and contacting the oversprayed paint with the alkalinity adjusted water and an aluminum coated silica sol, adding a flocculating agent and thereafter removing the resulting sludge. Paint spray booth water treatments for use in water based paint systems are disclosed in U.S. Pat. Nos. 5,250,189 and 5,073,205. U.S. Pat. No. 5,073,205 discloses a method for detackifying paint spray operation wastes comprising maintaining in the wash water a small amount of N-methylolacrylamide copolymer with methyldiallylamine.

While effective in treating paint spray booth water systems, metal salts and silicates do negatively impact the system being treated. Metal salts have a propensity to increase corrosion in the system and silicates can elevate foaming in the system.

SUMMARY OF THE INVENTION

The present inventors discovered that a combination of a copolymer of lignosulfonate and a cationic monomer subunit such as trimethylaminoethylacrylate chloride (AETAC) with $Na_2CO_3$ (soda ash) and/or NaOH provides detackification, coagulation and flocculation of paint solids in a paint spray booth water system. The treatment of the present invention is effective in treatment systems contaminated with waterborne and/or solventborne paints without the use of metal salts or silicates.

DETAILED DESCRIPTION OF THE PREFERRED EMBODIMENT

In accordance with the present invention, it has been discovered that copolymers of lignosulfonate and a cationic monomer subunit such as trimethylamino ethylacrylate chloride (AETAC) are effective and efficient detackifiers, coagulants and flocculants for waterborne and/or solventborne paints and their effectiveness and efficiency are not dependent upon the presence of added metal salts or silicates. The preferred cationic monomer subunit is AETAC. Other cationic monomer subunits which are believed to be similarly effective include but are not limited to methylacryloxyethyltrimethyl ammonium chloride (METAC) and methacrylamidopropyltrimethyl ammonium chloride (MAPTAC). For convenience the copolymers of the present invention will be described as the preferred lignosulfonate/AETAC copolymer.

Use of a combination of cationic copolymers of lignosulfonate/AETAC and $Na_2CO_3$ and/or NaOH as detackifiers for paint spray operations waters is typically carried out by adding an aqueous solution of the combination to fresh or recirculated water at a convenient location in the system being treated such as at a sump, upstream from the pumps, or at any advantageous location in the recirculating system. Preferably the treatment is added before the water enters the spray area circuit of the system being treated. The combination of lignosulfonate/AETAC and $Na_2CO_3$ and/or NaOH can be applied intermittently or continuously to the water system being treated. Since paint spraying is generally continuous, continuous addition of the combination is preferred. The combination may be added at any convenient location, but is preferably added so as to allow the maximum concentration of the combination to contact the oversprayed paints. For example, the combination may be added to a line supplying the trough or other device used to form the water curtain. Multiple points of addition may be used. In a typical paint spray booth operation, the return water from the booth generally encounters extreme turbulence. This turbulence improves the efficacy of the treatment by promoting intimate contact between the paint and the combination of a copolymer of lignosulfonate/AETAC and $Na_2CO_3$ and/or NaOH. The ratio of lignosulfonate to AETAC can range from about 10:90 to about 90:10 and preferably is about 30:70.

An effective amount of the combination should be added to the spray booth water system. As used herein, the term effective amount is that amount which is sufficient to reduce the tackiness of the waterborne and/or solventborne paint and coagulate and flocculate the paint so that it can be readily separated from the water by suitable means and the water can be recycled to the paint spray booth. Since the amount of paint contacting a water curtain varies depending upon a number of variables including plant or process shutdowns, the size of the items being painted, spraying techniques, water flow rate and the type of paint being used, the amount of paint that is captured can vary considerably. Under normal conditions, the dosage level of the combination of the present invention is within the range of from about 500 to 4000 parts per million and most preferably 1000 to 2500 parts per million with the copolymer of lignosulfonate/AETAC constituting about 500 to 1500 parts per million of the combination and the balance being $Na_2CO_3$ and/or NaOH.

The following examples are given for the purpose of illustrating the present invention and shall not be construed as being limitations on the scope or spirit of the present invention. Unless otherwise specified, references to percentages or parts are by weight.

EXAMPLES

A jar testing procedure was used to evaluate the efficacy of the combination of the present invention as well as determine preferred ratios of copolymer to inorganic materials. The procedure comprised adding 100 ml of tap water to a 120 ml jar. The treatment combination was added and the contents mixed. One ml of an automotive paint (waterborne or solventborne) was added to the jar. After vigorous shaking for 30 seconds a wooden tongue depressor was immersed in the solution and removed for examination. Tables I and II summarize the guidelines used for evaluating the detackification and clarification performance of the treatment.

TABLE I

| Rating | Definition |
|---|---|
| 1 | Paint forms large tacky globules and/or coating which adheres to the exposed surfaces of the jar and tongue depressor. |
| 2 | Paint forms agglomerates which are slightly tacky to touch, or upon crushing. Paint sludge coats the tongue depressor. |
| 3 | Paint forms granular flocs which adhere to less than 10% of the exposed surface area of the jar or depressor. |
| 4 | Paint forms particles, some of which appear as specks on less than 1% of the exposed surface area of the jar or depressor. Sludge is neither smeary nor tacky. |
| 5 | Paint forms particles which do not adhere to the exposed surfaces of the jar or depressor. The paint sludge may float, sink, or be dispersed in the water. |

TABLE II

Water Clarity Determination

| Rating | Definition |
|---|---|
| 1 | Opaque - cannot view "X" at 0.1 mL–5 mL |
| 2 | Cannot view "X" at 6 mL–25 ml |
| 3 | Cannot view "X" at 26 mL–50 ml |
| 4 | Cannot view "X" at 51 mL–75 ml |
| 5 | Clear, colorless - can view "X" at 100 mL |

Table III summarizes the results of jar testing on a variety of waterborne paints treated with a copolymer of lignosulfonate and AETAC in a ratio of 30:70. The results show the effectiveness of the combination with the treatment forming medium to large floc and providing excellent water clarity.

TABLE III

| Paint | Co-polymer Dose (ppm) | Activator Product | Dose (ppm) | pH | Floc | WC |
|---|---|---|---|---|---|---|
| Desoto (acrylic) | 600 | NaOH | | 9 | med. | 2 |
| Desoto (acrylic) | 800 | NaOH | | 9 | large | 4+ |
| Desoto (acrylic) | 400 | $Na_2CO_3$ | 1000 | | none | 1 |
| Desoto (acrylic) | 400 | $Na_2CO_3$ | 1500 | | small | 1 |
| Desoto (acrylic) | 750 | $Na_2CO_3$ | 1500 | | med. | 3 |
| Niles (acrylic) | 600 | NaOH | | 9 | large | 4 |
| Niles (acrylic) | 800 | NaOH | | 9 | large | 4 |
| Niles (acrylic) | 400 | $Na_2CO_3$ | 1500 | | small | 1 |
| Niles | 750 | $Na_2CO_3$ | 1500 | | large | 4/4+ |
| Laurence-David (acrylic) | 200 | NaOH | | 9 | large | 4 |
| Laurence-David (acrylic) | 500 | NaOH | | 9 | large | 3 |
| Laurence-David (acrylic) | 200 | $Na_2CO_3$ | 1500 | | large | 4/4+ |
| Laurence-David (acrylic) | 300 | $Na_2CO_3$ | 1500 | | large | 4+ |
| Akzo (acrylic) | 200 | NaOH | | 9 | med. | 3 |
| Akzo (acrylic) | 1000 | NaOH | | 9 | med. | 3+ |
| Akzo (acrylic) | 200 | $Na_2CO_3$ | 1500 | | none | 1 |
| Akzo (acrylic) | 500 | $Na_2CO_3$ | 1500 | | med. | 4/4+ |

Table IV summarizes jar testing of the combination with a variety of waterborne paints treated with a copolymer of lignosulfonate and AETAC in a ratio of 30:70 with and without the addition of 1000 parts per million or a solvent mixture of methylethylketone and dimethylamine. This solvent mixture helps to simulate actual plant conditions where solvent contamination of the water is common. The results show that the presence of the solvent did not affect the flocculation activity or resulting water clarity of the combination treatment of the present invention.

TABLE IV

| Paint | Copolymer Dose (ppm) | Product | Dose (ppm) | pH | MEK/ DMEA (ppm) | Floc | WC |
|---|---|---|---|---|---|---|---|
| Desoto (acrylic) | | NaOH | | 9 | 0 | large | 4 |
| Desoto (acrylic) | 800 | NaOH | 1500 | 9 | 1000 | large | 4 |
| Laurence-David (acrylic) | 300 | $Na_2CO_3$ | 1500 | | 0 | med. | 4+ |
| Laurence-David (acrylic) | 300 | $Na_2CO_3$ | 1500 | | 1000 | med. | 4+ |
| General Polymer (acrylic) | 500 | $Na_2CO_3$ | 1000 | | 0 | med. | 4/4+ |
| General Polymer (acrylic) | 500 | $Na_2CO_3$ | 1000 | | 1000 | med. | 4/4+ |
| Cook | 500 | $Na_2CO_3$ | 1000 | | 0 | large | 4+ |
| Cook | 500 | $Na_2CO_3$ | 1000 | | 1000 | large | 4+ |

Table V summarizes the results of jar testing showing the coagulation/flocculation/detackification effectiveness of the treatment combination (a copolymer of lignosulfonate and AETAC in a ratio of 30:70 with $Na_2CO_3$ or NaOH on waterborne/solventborne paints mixed at a 3 to 1 ratio. The results show excellent water clarity and paint kill.

TABLE V

| Paint | Copolymer Dose (ppm) | Product | Dose (ppm) | pH | Kill | WC |
|---|---|---|---|---|---|---|
| A | 600 | NaOH | | 9 | 3 | 2 |
| A | 1000 | NaOH | | 9 | 3 | 2 |
| A | 300 | $Na_2CO_3$ | 1500 | | 4/4+ | 4 |
| A | 500 | $Na_2CO_3$ | 1500 | | 4/4+ | 3+ |
| B | 500 | NaOH | | 9 | 4 | 4 |
| B | 700 | NaOH | | 9 | 4 | 4 |
| B | 500 | $Na_2CO_3$ | 1000 | | 4 | 1 |
| B | 500 | $Na_2CO_3$ | 1500 | | 4+ | 4 |
| C | 600 | NaOH | | 9 | 4+ | 3 |
| C | 800 | NaOH | | 9 | 4+ | 3 |
| C | 800 | $Na_2CO_3$ | 1000 | | 4+ | 3+ |
| C | 1000 | $Na_2CO_3$ | 1000 | | 4+ | 4/4+ |
| D | 600 | NaOH | | 9 | 1 | 1 |
| D | 1000 | NaOH | | 9 | 1 | 1 |
| D | 300 | $Na_2CO_3$ | 2000 | | 4/4+ | 3 |
| D | 600 | $Na_2CO_3$ | 2000 | | 3 | 1 |
| E | 600 | NaOH | | 9 | 1 | 1 |
| E | 1000 | NaOH | | 9 | 1 | 1 |
| E | 300 | $Na_2CO_3$ | 1000 | | 4+ | 4/4+ |
| E | 800 | $Na_2CO_3$ | 1000 | | 4+ | 2 |

Table VI summarizes the results of jar testing of the treatment combinations (copolymer of lignosulfonate/AETAC with $Na_2CO_3$ on waterborne/solventborne paint mixtures (3 to 1 ratio) with and without the addition of 1000 parts per million of a solvent mixture of methylethylketone and dimethylethylamine. The results show that the treatment combination performance is not affected by the presence of the solvent.

TABLE VI

| Paint | Copolymer Dose (ppm) | Product | Dose (ppm) | MEK/ DMEA (ppm) | Floc | Kill |
|---|---|---|---|---|---|---|
| A | 300 | $Na_2CO_3$ | 1500 | 0 | med | 4/4+ |
| A | 300 | $Na_2CO_3$ | 1500 | 1000 | med | 4/4+ |
| B | 500 | $Na_2CO_3$ | 1500 | 0 | med | 4+ |
| B | 500 | $Na_2CO_3$ | 1500 | 1000 | med | 4+ |
| C | 1000 | $Na_2CO_3$ | 1000 | 0 | med | 4+ |
| C | 1000 | $Na_2CO_3$ | 1000 | 1000 | med | 4+ |
| D | 300 | $Na_2CO_3$ | 1000 | '0 | med | 4/4+ |
| D | 300 | $Na_2CO_3$ | 1000 | 1000 | med | 4/4+ |

While the present invention has been described with respect to particular embodiments thereof, it is apparent that other forms and modifications of this invention will be obvious to those skilled in the art. The appended claims and this invention generally should be construed to cover all such obvious forms and modifications which are within the true spirit and scope of the present invention.

We claim:

1. A method of detackifying oversprayed paint which contacts and is captured by water circulating in a paint spray booth operation which comprises adding to said circulating water an effective amount of a combination of a copolymer of lignosulfonate and cationic monomer unit selected from the group consisting of trimethylaminoethylacrylate chloride, methylacryloxyethyltrimethyl ammonium chloride and methacrylamidopropyltrimethyl ammonium chloride with an inorganic material selected from the group consisting of $Na_2CO3$ and NaOH to reduce the tackiness of waterborne and/or solventborne paint, wherein the ratio of lignosulfonate to cationic monomer unit ranges from about 10:90 to about 90:10.

2. The method of claim 1 wherein said effective amount is from about 500 to about 4000 parts per million.

3. The method of claim 1 wherein the ratio of copolymer to inorganic material ranges from about 1:1 (weight ratio) to 1:4.

* * * * *